(12) United States Patent
Lin

(10) Patent No.: US 7,731,372 B2
(45) Date of Patent: Jun. 8, 2010

(54) PROJECTOR

(75) Inventor: Ming-Kuen Lin, Yunlin County (TW)

(73) Assignee: Qisda Corporation, Taoyuan County (TW)

( * ) Notice: Subject to any disclaimer, the term of this patent is extended or adjusted under 35 U.S.C. 154(b) by 495 days.

(21) Appl. No.: 11/840,192

(22) Filed: Aug. 16, 2007

(65) Prior Publication Data

US 2008/0055569 A1 Mar. 6, 2008

(30) Foreign Application Priority Data

Aug. 31, 2006 (TW) .............................. 95132191 A

(51) Int. Cl.
G03B 21/28 (2006.01)
(52) U.S. Cl. .............................. 353/99; 353/98; 353/100
(58) Field of Classification Search .................. 353/98, 353/99, 100, 101; 250/566, 201.2
See application file for complete search history.

(56) References Cited

U.S. PATENT DOCUMENTS 7,390,098 B2 * 6/2008 Wada .......................... 353/101

* cited by examiner

*Primary Examiner*—Georgia Y Epps
*Assistant Examiner*—Tony Ko

(57) ABSTRACT

A projector comprises a light source unit, a light guide element, a first focus element, a second focus element, a micromirror element and an image unit. The light source unit provides a light beam. The first focus element comprises a first focal length $f_1$. The second focus element comprises a second focal length $f_2$, wherein $$2.0 < \frac{f_2}{f_1} < 3.6.$$

The light beam travels from the light source unit, passing the light guide element, the first focus element, the second focus element and the micromirror element to the image unit.

16 Claims, 3 Drawing Sheets

PROJECTOR

BACKGROUND OF THE INVENTION

1. Field of the Invention

The invention relates to a projector, and in particular to a minimized projector.

2. Description of the Related Art

In conventional projectors, the light beam is reflected and focused many times by optical elements to control the performance (especially the brightness and the size) of images and to minimize the dimension of projectors. However, focal lengths of multiple optical elements are not integrally considered and distances between them are usually arranged based on previous design. Thus, dark edges and deteriorated brightness can often found in images, particularly in compact projectors.

BRIEF SUMMARY OF THE INVENTION

A detailed description is given in the following embodiments with reference to the accompanying drawings.

A projector comprises a light source unit, a light guide element, a first focus element, a second focus element, a micromirror element and an image unit. The light source unit provides a light beam. The first focus element comprises a first focal length $f_1$. The second focus element comprises a second focal length $f_2$, wherein $$2.0 < \frac{f_2}{f_1} < 3.6.$$

The light beam travels from the light source unit, passing the light guide element, the first focus element, the second focus element and the micromirror element to the image unit.

The embodiment provides a minimized projector with improved brightness and projection.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
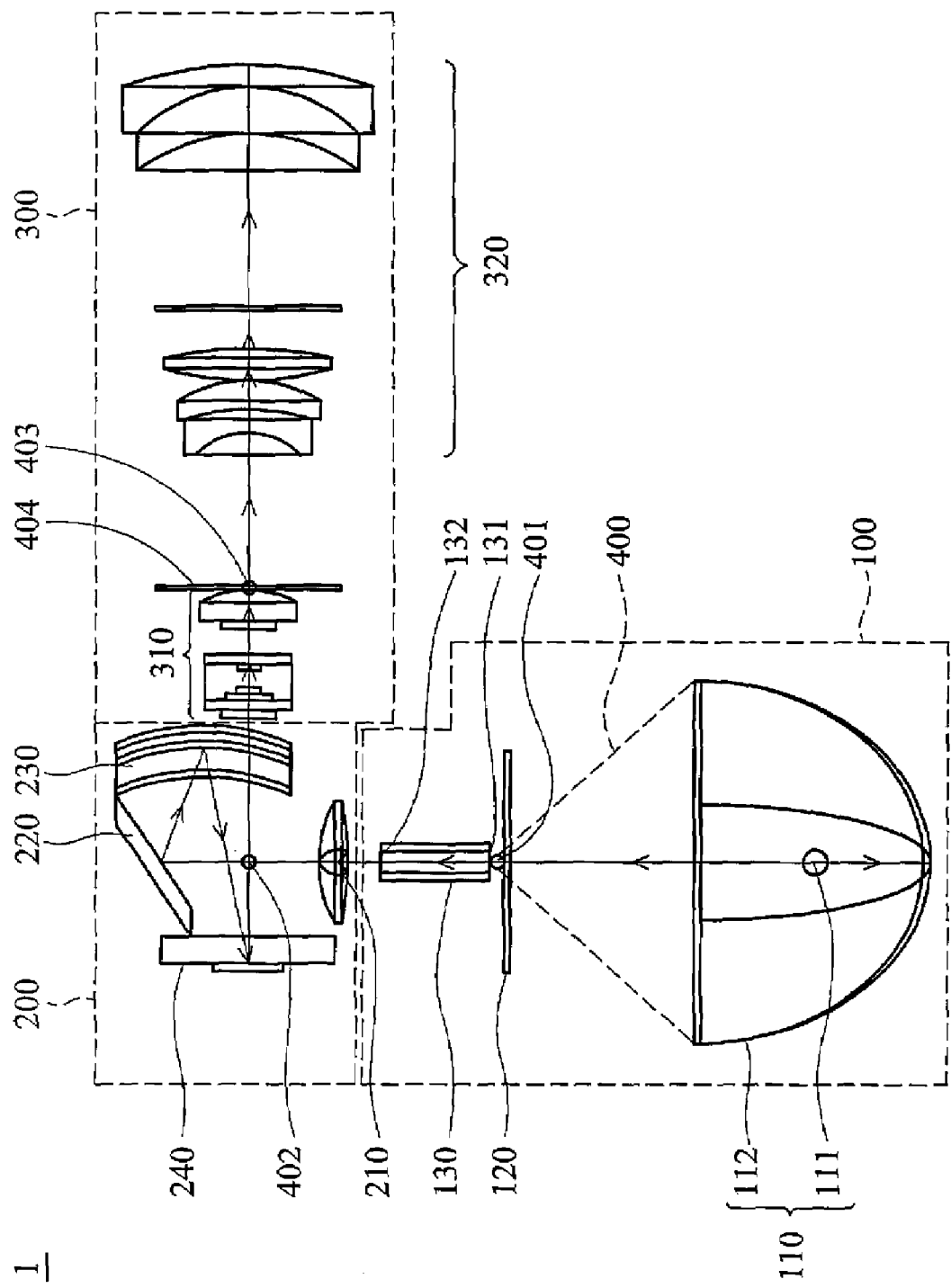
FIG. 1 shows a projector of an embodiment of the invention.

FIG. 1 shows a projector 1 of an embodiment of the invention, comprising a light source unit 100, an illumination unit 200, and an image unit 300. The light source unit 100 comprises an ellipsoid lamp 110, a color wheel 120, and a light guide element (light pipe) 130. The illumination unit 200 comprises a first focus element (relay lens) 210, a reflector 220, a second focus element 230 and a micromirror element 240. The image unit 300 comprises a first lens set 310 and a second lens set 320.

The ellipsoid lamp 110 comprises a light source 111 and an ellipsoid reflector 112.

The light source 111 is located on a first focal point of the ellipsoid reflector 112 providing a light beam 400. The ellipsoid reflector 112 focuses the light beam 400 on a second focal point of the ellipsoid reflector 112 located on a first end 131 of the light guiding element 130. The light beam 400 travels from the ellipsoid lamp 110, passing the color wheel 120 and the light guiding element 130, and enters the illumination unit 200.

The light beam 400 enters the illumination unit 200, passing the first focus element 210, the reflector 220, the second focus element 230 and a micromirror element 240, and enters the image unit 300. The light beam 400 enters the image unit 300, passing the first lens set 310 and the second lens set 320, projected on a projection plane. The second focus element 230 and the image unit 300 are located on different planes (not aligned on a single straight line).

In the embodiment, the first focus element 210 comprises a first focal length $f_1$, the second focus element 230 comprising a second focal length $f_2$, wherein $$2.0 < \frac{f_2}{f_1} < 3.6.$$

Imaging actions in the projector 1 comprise energy transmission and image transmission. When the relationship between the first and second focal lengths satisfies $$2.0 < \frac{f_2}{f_1} < 3.6,$$

the imaging actions exhibit improved efficiency, and aberration is reduced.

Figure 2:
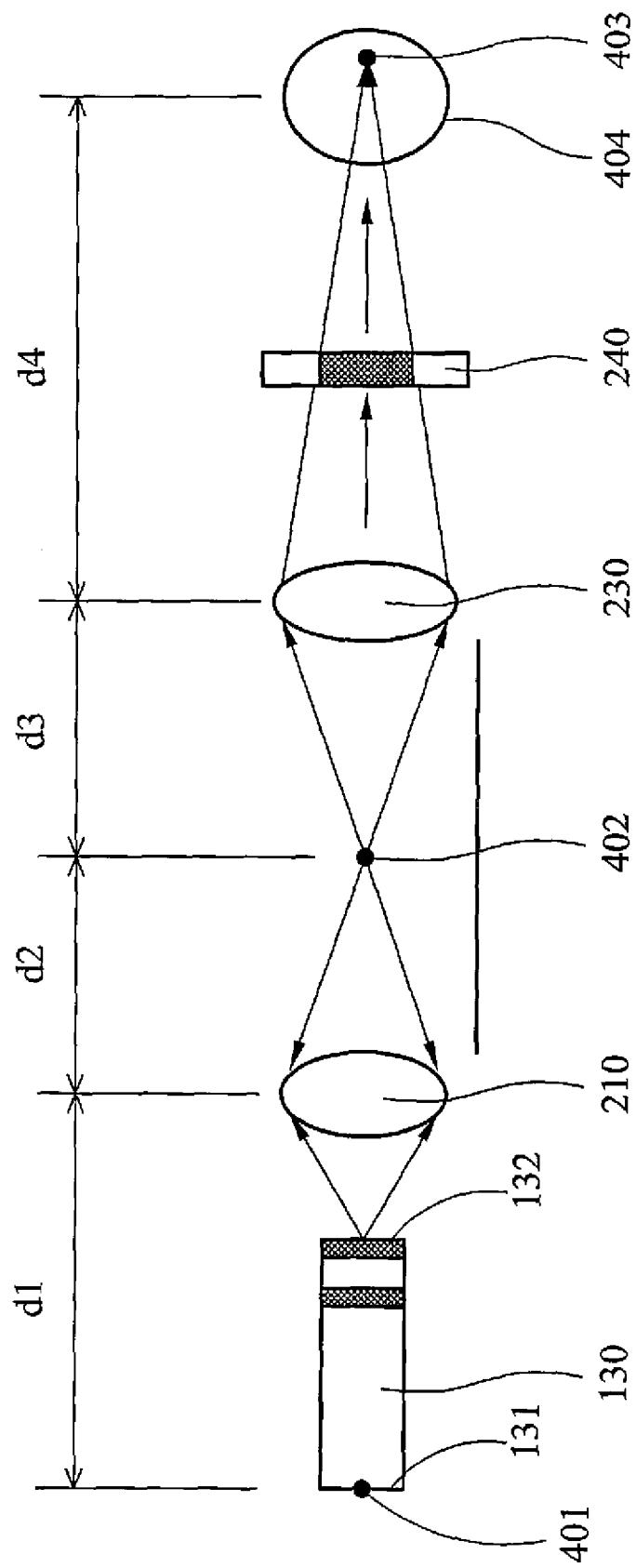
FIG. 2 is an equivalent diagram showing energy transmission in the projector of the embodiment of FIG. 1.

FIG. 2 is an equivalent diagram of FIG. 1 showing the light guide element 130, the first focus element 210, the second focus element 230 and the micromirror element 240. With reference to FIG. 2, the ellipsoid lamp focuses the light beam as a first arc 401 on a first end 131 of the light guide element 130. The first arc 401 is located on a first side of the first focus element 210. A first distance d1 is formed between the first arc 401 and a principle plane of the first focus element 210. First distance d1 is more than double the first focal length $f_1$. The first arc 401 casts a second arc 402 (real image) on a second side of first focus element 210. A second distance d2 is formed between the second arc 402 and the principle plane of the first focus element 210, and the second distance d2 is one to two times the first focal length $f_1$. A third distance d3 is formed between the second arc 402 and the principle plane of the second focus element 230, and the third distance d3 is one to two times that of the second focal length $f_2$. Thus, the second arc 402 casts a third arc 403 (real image) on a third side of second focus element 230. A fourth distance d4 is formed the third arc 403 and a principle plane of the second focus element 230, and the fourth distance d4 is more than twice the second focal length $f_2$. Therefore, third arc 403 is located on a pupil 404 (a diaphragm of the image unit 300).

The actual locations of the first arc 401, the second arc 402, the third arc 403 and the pupil 404 are shown in FIG. 1.

Because the third arc 403 images (focuses) on the pupil 404 rather than on the projection plane of the projector, the projector 1 can provide sufficient and uniform brightness.

In the embodiment, the arcs are real images. Thus, optical energy is plenarily transmitted to provide sufficient brightness.

Figure 3:
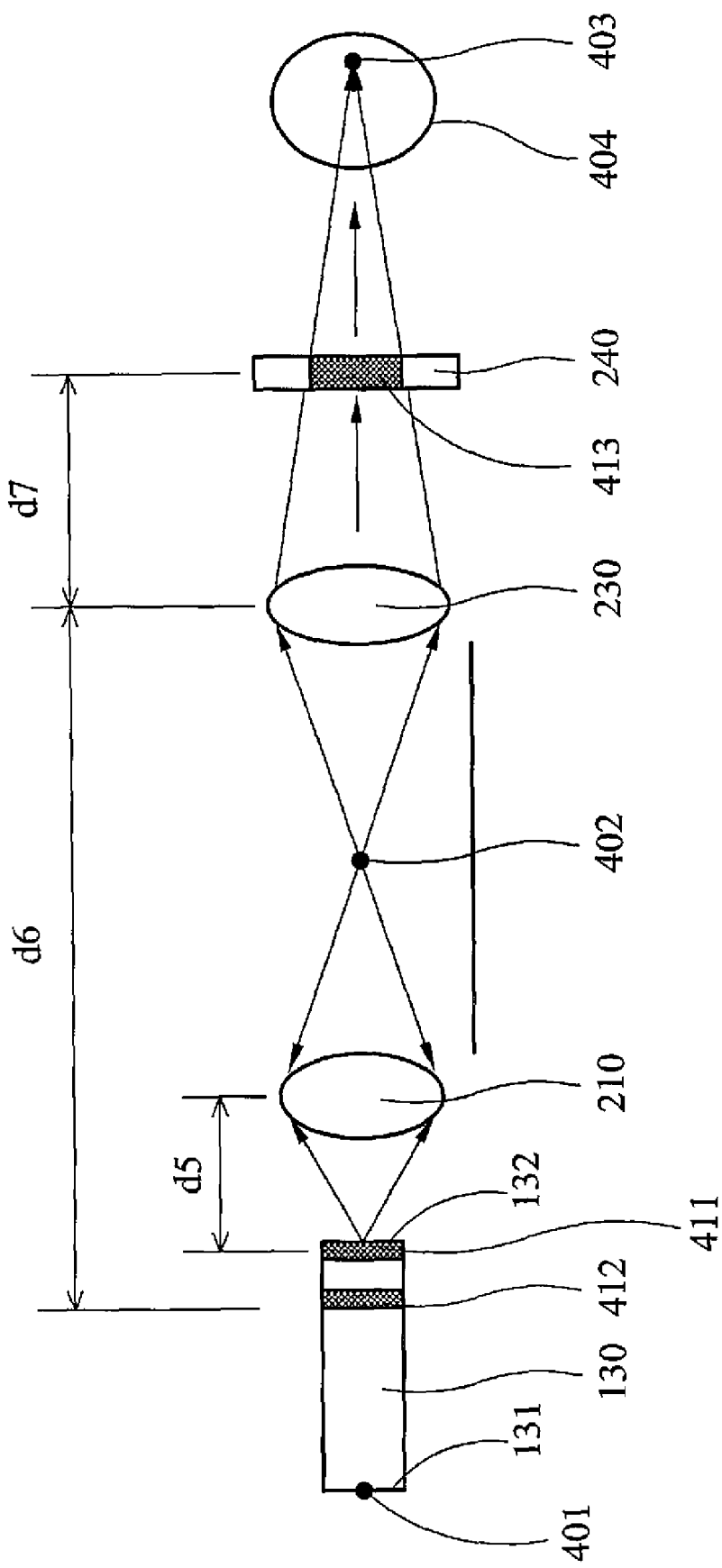
FIG. 3 shows image transmission in a projector of the embodiment.

FIG. 3 shows image transmission in the projector 1. The light beam is emitted from a second end 132 of the light guide element 130 as an emitting light 411. The emitting light 411 is located on the first side of the first focus element 210. A fifth distance d5 is formed between the second end 132 and the principle plane of the first focus element 210, and is less than the first focal length $f_1$. The emitting light 411 forms a first image 412 (erect virtual image) at the first side of the first focus element 210. A sixth distance d6 is formed between the first image 412 and the principle plane of the second focus element 230 and is more than twice the second focal length $f_2$. The micromirror element 240 is disposed on a third side of the second focus element 230. A seventh distance d7 is formed between the micromirror element 240 and the principle plane of the second focus element 230, and is one to two times the second focus length $f_2$. The first image 412 casts a second image 413 on the micromirror element 240.

The second image 413 is located in the range of one to two times the second focus length $f_2$. Thus, the size of the second image 413 can be controlled, the second image 413 is uniformly projected on the micromirror element 240, and dark edges are prevented. The second image 413 is projected to the micromirror element 240, reflected thereby, passing the image unit 300 to be projected on the projection plane.

In the embodiment, the relation of the first length $f_1$ and second focal length $f_2$ satisfies $$2.0 < \frac{f_2}{f_1} < 3.6.$$

Thus the energy transmission and the image transmission conform with the aforementioned disclosure. If $$\frac{f_2}{f_1}$$

exceeds 3.6, the size of the optical elements in the projector 1 increases. If $$\frac{f_2}{f_1}$$

is small than 2.0, the curvature of the first focus element 210 increases, and first focus element 210 is difficult to produce.

The invention provides a minimized projector with improved brightness and projection.

In the aforementioned embodiment, the first focus element 210 is a first refraction lens (for example, convex lens), which is spherical or aspherical. The second focus element 230 is a concave mirror, which is spherical or aspherical. In a modified embodiment, the second focus element 230 is a second refraction lens, and the projector further comprises at least one reflector (for example, a flat mirror) corresponding to the second refraction lens. The reflector reflects the light beam 400 passing the first and second refraction lenses to the micromirror element 240.

The second focal length $f_2$ is preferably between 20 mm and 50 mm.

The diameter of the light source 111 is preferably about 1 mm to 1.3 mm.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A projector, comprising:
   a light source unit, providing a light beam;
   a light guide element;
   a first focus element, comprising a first focal length $f_1$;
   a second focus element, comprising a second focal length $f_2$, wherein $$2.0 < \frac{f_2}{f_1} < 3.6;$$

a micromirror element; and
   an image unit, wherein the light beam travels from the light source unit, passing the light guide element, the first focus element, the second focus element and the micromirror element to the image unit wherein the light source unit focuses the light beam as a first arc on a first end of the light guide element, the first arc is located on a first side of the first focus element, and a first distance between the first arc and the first focus element is twice longer than the first focal length f1.

2. The projector as claimed in claim 1, wherein the second focal length $f_2$ is between 20 mm and 50 mm.

3. The projector as claimed in claim 1, wherein the first arc casts a second arc on a second side of first focus element, and a third distance between the second arc and the second focus element is greater than the second focal length $f_2$ and smaller than the double of the second focal length $f_2$.

4. The projector as claimed in claim 1, wherein the light beam emits from a second end of the light guide element as an emitting light, and a fifth distance between the second end of the light guide element and the first focus element is less than the first focal length $f_1$.

5. The projector as claimed in claim 4, wherein the emitting light forms a first image on a first side of the first focus element, and a sixth distance between the first image and the second focus element is twice longer than the second focal length $f_2$.

6. The projector as claimed in claim 5, wherein the micromirror element is disposed on a third side of the second focus element, a seventh distance between the micromirror element and the second focus element is greater than the second focal length $f_2$ and smaller than the double of the second focus length $f_2$, and the first image casts a second image on the micromirror element.

7. The projector as claimed in claim 1, wherein the first focus element is a first refraction lens.

8. The projector as claimed in claim 7, wherein the first refraction lens is a spherical lens.

9. The projector as claimed in claim 7, wherein the first refraction lens is an aspherical lens.

10. The projector as claimed in claim 7, wherein the first refraction lens comprises a convex lens.

11. The projector as claimed in claim 1, wherein the second focus element is a concave mirror.

12. The projector as claimed in claim 11, wherein the concave mirror is a spherical mirror.

13. The projector as claimed in claim 11, wherein the concave mirror is an aspherical mirror.

14. The projector as claimed in claim 1, further comprising:
a reflector, corresponding to the second focus element, wherein the second focus element is a second refraction lens, and the reflector reflects the light beam passing the second refraction lens to the micromirror element.

15. The projector as claimed in claim 1, wherein the light guide element is a light pipe.

16. The projector as claimed in claim 1, wherein the light source unit comprises:
an ellipsoid reflector, comprising a first focal point; and
a light source, located on the first focal point.

* * * * *